3,639,567
METHOD FOR CABLE-BLOCKING WITH POLYURETHANE FOAM
Harold C. Hervig, Maplewood, Minn., assignor to Minnesota Mining and Manufacturing Company, St. Paul, Minn.
No Drawing. Filed Nov. 5, 1968, Ser. No. 773,628
Int. Cl. B29d 27/04; H02g 15/20
U.S. Cl. 264—45                                                        5 Claims

ABSTRACT OF THE DISCLOSURE

An improvement in the method for in situ formation of gas-tight cable blocks in pressurized multi-conductor cables, the improvement comprising forming the cable block from a self-curing mixture of polyurethane precursor ingredients that exhibits a controlled foaming as it cures and thus a controlled expansion that forces the mixture between the conductors in the cable. The polyurethane composition reaches a viscosity of at least about 50,000 centipoises before a major amount of foaming and during foaming expands to between 5 and 25 percent of its original size.

BACKGROUND OF THE INVENTION

Multi-conductor sheathed cables, such as telephone or other communications cables, are often protected against moisture-penetration over critical parts of their length by maintaining dry air or another gas under pressure inside the cable. If any leak develops in the outside sheath of the conductor, the pressure of the gas escaping prevents moisture from entering the cable, and, in addition, regular monitoring of the pressure along the cable permits location of a leak, since a reduction in pressure or increase in gas used occurs in the area of the leak.

When access to such a pressurized cable is desired, as when electrical connections are to be made to the cable to provide service to a house, it is necessary to form essentially gas-tight blocks in the cable on both sides of the area where the work is to be performed. These cable blocks are generally formed in situ by introducing a self-curing liquid composition inside the cable or inside a mold surrounding a portion of the cable from which the sheath has been removed. The composition is introduced in an amount sufficient to fill the inside of a short length of the cable—including the area between the sheath or mold and the conductors as well as between the conductors themselves—and then allowing the composition to cure.

But the previous methods and self-curing compositions used to provide cable blocks have not been fully satisfactory. Often an adequate seal is not obtained with the first attempt, as when the liquid composition does not fully penetrate through a tightly bundled group of wires. More often, the changes in temperature or severe moisture and other environmental conditions to which a cable may be subjected cause blocks to fail, as by separation of the block from an interface with the insulation around a conductor so that gas escapes, whereupon the block must be repaired or reformed.

SUMMARY OF THE INVENTION

In the present invention, cable blocks are formed from a self-curing polyurethane composition that exhibits a controlled expansion as it cures, whereby it is forced between the insulated conductors in the cable to form a full, tight seal. The controlled expansion is obtained by taking advantage of the normal susceptibility for the isocyanate groups of the polyisocyanate precursor in the composition to react with any water present to form carbon dioxide that then acts to foam the polyurethane as it is formed. The self-curing compositions of this invention are formulated to undergo a foaming that is controlled both as to time of occurrence—the principal expansion occurring after the mixture has reached a highly viscous stage—and as to amount—the total expansion being between about 5 and 25 percent. Since the foaming does not occur until the composition has cured to a viscous stage, the composition does not flow freely along the cable under the force of the pressure caused by the generated carbon dioxide, but instead a great deal of radial pressure develops which forces the liquid composition between the insulated conductors in the cable.

More specifically, the self-curing composition used in the invention to obtain the desired controlled expansion includes:

(1) polyisocyanate and active-hydrogen-containing precursor ingredients that cure as a polyurethane, and (2) a catalyst-water blend including:

(a) A catalyst that promotes reaction between isocyanate groups and the active hydrogens of an active-hydrogen-containing compound in preference to reaction between isocyanate groups and water, and (b) Water.

The catalyst and water are included in proportions such that the composition gels and reaches a viscosity of at least about 50,000 centipoises before significant foaming of the composition occurs, and, such that upon ultimate reaction of the isocyanate groups and water, sufficient carbon dioxide is formed to expand the composition to between 5 and 25 percent of its original size.

DETAILED DESCRIPTION

In general, materials useful to form cable blocks can range rather widely in such properties as hardness, tensile strength, elongation, etc., though they should have some flexibility, and a wide variety of polyisocyanate and active-hydrogen-containing ingredients are useful in the self-curing compositions of this invention. Typical of the useful polyisocyanates are such commonly used organic diisocyanates as toluene diisocyanate, hexamethylene diisocyanate, and 4,4'-methylene bis(cyclohexyl isocyanate). Active-hydrogen-containing compounds include such hydroxyl-containing compounds as polyethers, such as polyalkylene ether glycols, hydroxyl-terminated polyesters, such as made by condensing adipic, terephthalic, maleic acids, etc. with glycols or higher alkylene and polyalkylene ether glycols, and castor oil and castor oil derivatives. The hydroxyl-containing compounds are preferred active-hydrogen-containing compounds, since they provide cable blocks of good water-resistance, their reaction with the polyisocyanate is more easily controlled, and they are less expensive. However, polyamines, such as methylene bis(o-chloroaniline) and polycarboxylic acids, such as dimerized fatty acids can also be used. In general, the polyisocyanate and active-hydrogen-containing compounds are included in proportions such as to provide a ratio of isocyanate groups to active hydrogens of between about 1.1:1 and about 0.8:1.

To obtain the controlled expansion of the composition that is desired, the reaction of the isocyanate groups with the active-hydrogen-containing compound must occur faster than the reaction between the isocyanate groups and water. This is accomplished, as indicated above, by including a catalyst that promotes the urethane-forming reaction in preference to the carbon-dioxide-forming reaction. Any such catalyst may be used, but one especially desired class of catalysts are organic compounds that include divalent mercury and that are soluble in the polyol that is being reacted with the polyisocyanate (even in an amount as little as one part per 1,000 parts of polyol). Among suitable organic mercuric compounds are the mercuric salts of carboxylic acids, for example, mercuric salts of acetic, octanoic, stearic, methacrylic, phthalic, benzoic, and other acids, and organomercuric compounds in which one of the mercury valences is directly bonded to a carbon atom of an organic moiety (known as monoorganomercuric compounds), for example, aryl mercuric acetate, or aryl mercuric hydroxide, etc. Such mercuric compounds having sufficient polyol solubility to dissolve in the polyol in the amounts necessary to catalyze the urethane-forming reaction are known to the art; note, for example, British Pat. No. 1,053,383. Other suitable mercuric compounds are illustrated in U.S. Pats. 3,395,108 and 3,304,316, British Pat. 909,358, and Belgian Pat. 704,327.

The preferred catalysts are the aryl mercuric compounds, and particularly phenylmercuric acetate or phenylmercuric hydroxide. The monoorgano-mercuric compounds are generally more potent catalysts than other mercuric compounds and these can be used in lesser quantities; they also permit longer working times than do other classes of mercuric compounds without, however, lengthening the overall curing time.

Although the organo-mercuric catalysts are effective in the self-curing compositions of the invention in amounts as small as 0.01 weight-percent of polyol ingredients, a preferred range under ambient curing conditions has been found to be from about 0.1 to about 1 weight-percent of polyol ingredients. Using the mercuric salts of carboxylic acids, the preferred percentage is from about 0.5 to about 2 weight-percent of polyol ingredients. While greater amounts can be used, they are not necessary. When using these described mercuric catalysts in compositions of the invention, such moderately hindered arylene diisocyanates as toluene diisocyanates, or prepolymers formed from them, are preferred polyisocyanates, but unhindered diisocyanates may also be used.

Water is included in the composition in a proportion that will cause some reaction between the isocyanate groups and the water to occur even in the presence of a catalyst that promotes formation of urethane linkages in substantial exclusion to promoting reaction of the isocyanate groups with water. The amount of water needed to cause the right amount of foaming to occur and to cause the right timing for the foaming may be varied by including a catalyst that promotes reactions between isocyanate groups and water as well as between isocyanate groups and polyols. Such catalysts include amines such as triethylene diamine, dibutyl tin dilaurate, etc. In general, the kind and proportions of catalysts and the proportions of water that are appropriate for causing the desired amount of foaming, and for causing the foaming to occur at the proper time, can readily be determined in a simple laboratory test. For example, a few grams of a mixture including the desired polyurethane precursor ingredients, the desired urethane-promoting catalyst, and a small, measured amount of water may be poured in a container, and the relationship observed between the time after which the greatest bubble formation occurs and the time when the composition becomes highly viscous. Most often, the needed amount of water is quite small, generally being less than about 0.5 weight-percent of the whole composition.

For the desired results, the composition should, as previously indicated, exhibit an expansion from its original size of between about 5 and 25 percent. An expansion less than about 5 percent does not assure a full seal, while an expansion more than 25 percent places too much pressure on the cable. In addition, as previously indicated, the major amount of the expansion should occur after the composition reaches a viscosity of about 50,000 centipoises. If the viscosity of the composition is less than about 50,000 centipoises when significant foaming occurs, the pressure produced by the foaming will unduly force the composition along the length of the cable, resulting in gaps or weaknesses in the block and inefficient use of material. Most preferably, the bubbles formed in the final composition are rather small, as less than 50 mils in diameter, and this condition generally occurs when the principal expansion occurs after the composition is quite viscous.

The self-curing compositions of this invention generally exist as two parts until immediately prior to application. The two parts are mixed together at the job site, whereupon they form a mixture that has a rather low viscosity, generally less than 10,000 centipoises, and preferably less than 5,000 centipoises, so that the mixture can be readily introduced inside the cable and thoroughly penetrate between the conductors in the cable. It is desirable that the compositions have a pot life of several minutes (more than about 5 minutes) after mixing of the two parts, but preferably in less than 30 minutes they become quite viscous.

The invention is further illustrated in the following examples:

EXAMPLE 1

A self-curing liquid composition useful to form a cable block was formed in two parts. Part A was a polyisocyanate prepolymer which had an isocyanate equivalent weight of about 222 and had been formed from the following ingredients:

| | Parts by wt. |
|---|---|
| Toluene diisocyanate | 53.28 |
| Castor oil [1] | 34.88 |
| Hexylene glycol | 4.48 |
| Diisooctyl phthalate | 7.00 |

[1] DB grade from Baker Castor Oil Company, comprising primarily the triglyceride of ricinoleic acid, and having an acid value of 1, a hydroxyl number of 162, an iodine number of 86, and a saponification value of 180.

Part B included 50 parts of a mixture of the following ingredients:

| | Parts by wt. |
|---|---|
| Castor oil as described above | 62.03 |
| A tetrafunctional derivative of a glycol and ricinoleic acid having a hydroxyl number of 335, a hydroxyl functionality of 4.2 and an acid number of 3 (Polycin 12) | 29.87 |
| 1,3-butane diol | 6.89 |
| Phenylmercuric acetate | 0.26 |
| Triethylene diamine (Dabco 33 LV) | 0.06 |
| Silicon-type surfactant (General Electric Surfactant SE 1109) | 0.50 |
| Deionized water | 0.30 |

Two-hundred weight-parts of part A were mixed with 190 weight-parts of part B and the whole composition then inserted with a caulking gun through a ¼-inch-diameter aperture that had been formed in the sheath of a 0.84 inch-diameter, single-sheathed 50-pair, 22-gauge cable in alignment with the opening in a cylindrical fitting placed over the cable. About 200 grams of material were inserted inside the cable. The filled cable was then set aside and the liquid composition allowed to cure for 24 hours.

Several cable blocks formed according to this example were tested for the adequacy of their seal by subjecting a short length of cable including a block to a temperature cycle in which the temperature was raised to 150° F. and then cooled to −20° F. Between cycles the cable was pressurized behind the block with air at 20 pounds per square inch and then immersed in water. Passage of an air bubble into the water was generally first noted with blocks formed according to this example between 50 and 200 such temperature cycles. By contrast, an unfoamed cable block made with the same polyurethane precursor ingredients and phenylmercuric acetate but without any water added failed between 30 and 45 cycles. And a block made from a commercial self-curing composition that includes a diglycidyl ether of bisphenol A and a modified amine curing agent failed in 35 cycles.

Three other catalyst-water blends using different proportions of the above catalysts were also tested in other formulations of the above precursor ingredients (without the surfactant). Water was added in two of these formulations, while in the third formulation, the water inherently present in the polyol (about 0.02 to 0.05 weight-percent of the whole composition) was relied on. These three different formulations were each poured into a small container and observed as to the time when bubbles were first noted, the viscosity of the composition when bubbles were first noted, the time required for the composition to gel, the time after which the greatest expansion of the composition occurred, the viscosity the composition reached before the greatest expansion occurred, and the amount of total expansion of the composition (measured by specific gravity comparisons). Viscosity measurements were made by periodically immersing a Brookfield No. 4 spindle in the small container. Each of these formulations, whose results are reported below, would be satisfactory for use in forming a cable block (the amounts of phenylmercuric acetate, amine, and water added are given as percents of the whole mixture).

| Sample | A | B | C |
|---|---|---|---|
| Phenylmercuric acetate (percent) | 0.21 | 0.21 | 0.1 |
| Amine (percent) | 0 | 0.05 | 0.05 |
| Water added (percent) | 0.24 | 0 | 0.06 |
| Bubbles first noted, Time (minutes) | 7 | 8 | 8 |
| Viscosity when bubbles first noted (cps.) | 1,850 | 3,400 | 1,500 |
| Gel time (minutes) | 11 | 11 | 22 |
| Time after which greatest expansion occurred (minutes) | 11 | 11 | 21–22 |
| Viscosity after which greatest expansion occurred (cps.) | 50,000–100,000 | 100,000 | 50,000–100,000 |
| Total expansion (percent) | 11.2 | 10.4 | 10.7 |

EXAMPLE 2

A two-part self-curing liquid composition was prepared. Part A comprised a polyisocyanate prepolymer having an isocyanate equivalent weight of about 195 and which had been formed from the following ingredients:

Toluene diisocyanate _____ 62.3
Polypropylene glycol having a molecular weight of 400 _____ 31.4
Polypropylene glycol having a molecular weight of 400 _____ 6.0

One-hundred-eighteen weight-parts of the above prepolymer were mixed with 133 parts of a polyol mixture that included 83 parts of castor oil (as described in Example 1), 40 parts of Polycin 12 and 9 parts of 1,3-butane diol. The polyol mixture also included between 0.02 and 0.05 weight-percent of water.

To the above mixture were added 0.52 part (0.21 weight-percent) of the whole composition of phenylmercuric hydroxide, 0.24 part (0.096 weight-percent) of dibutyl tin dilaurate, and 0.3 part (0.12 weight-percent) of water. When poured into a small container, this composition gelled in seven minutes. Bubbles were noticed in the formulation about six minutes after it was poured into the container, at which time the viscosity was about 1400 centipoises. Eleven minutes after pouring into the container, the greatest expansion and foaming occurred, and at that point the viscosity of the composition was about 50,000 centipoises. The total expansion of the composition was about 14 percent.

What is claimed is:
1. In a method for in situ formation of gastight cable blocks in sheathed multi-conductor pressurized cables in which a short length of cable is filled with a self-curing liquid composition that is then allowed to cure, the improvement which comprises using as the liquid composition a self-curing liquid composition that exhibits a controlled expansion as it cures and which includes
   (1) polyisocyanate and active-hydrogen-containing precursor ingredients that react to form a solid polyurethane, and
   (2) a catalyst-water blend including,
      (a) a catalyst that promotes reaction between isocyanate groups and the active hydrogens of an active-hydrogen-containing compound in preference to promoting reaction between isocyanate groups and water, and
      (b) water,
   the catalyst and water being included in proportions such that the composition reaches a viscosity of at least about 50,000 centipoises before a major amount of foaming of the composition occurs, and, upon ultimate reaction of the isocyanate groups and water, sufficient carbon dioxide is formed to expand the mixture to between about 5 and 25 percent of its original size.

2. A method of claim 1 in which the active-hydrogen-containing compound is a polyol.

3. A method of claim 1 in which the catalyst-water blend in the liquid composition further includes a catalyst that promotes reaction between isocyanate groups and water.

4. A method of claim 1 in which the active-hydrogen-containing compound is a polyol and the catalyst that promotes reaction between isocyanate groups and active hydrogens is an organic compound that includes divalent mercury and that is soluble in the polyol.

5. A method of claim 4 in which the catalyst that promotes reaction between isocyanate groups and active hydrogen is a monoorgano-mercuric compound.

References Cited

UNITED STATES PATENTS

| 2,186,793 | 1/1940 | Wodtke | 264—45 X |
| 3,310,615 | 3/1967 | Bender | 264—45 |
| 3,386,927 | 6/1968 | Rosecrans | 260—2.5 AX |
| 3,395,108 | 7/1968 | Cobbledick | 260—2.5 AB |
| 3,419,509 | 12/1968 | Willett | 260—2.5 AB |
| 3,427,393 | 2/1969 | Masterson | 264—45 X |

FOREIGN PATENTS 909,358   10/1962   Great Britain ____ 260—2.5 AB

DONALD J. ARNOLD, Primary Examiner

P. A. LEIPOLD, Assistant Examiner

U.S. Cl. X.R.

174—23; 360—2.5 AB; 264—272